Patented Aug. 28, 1928.

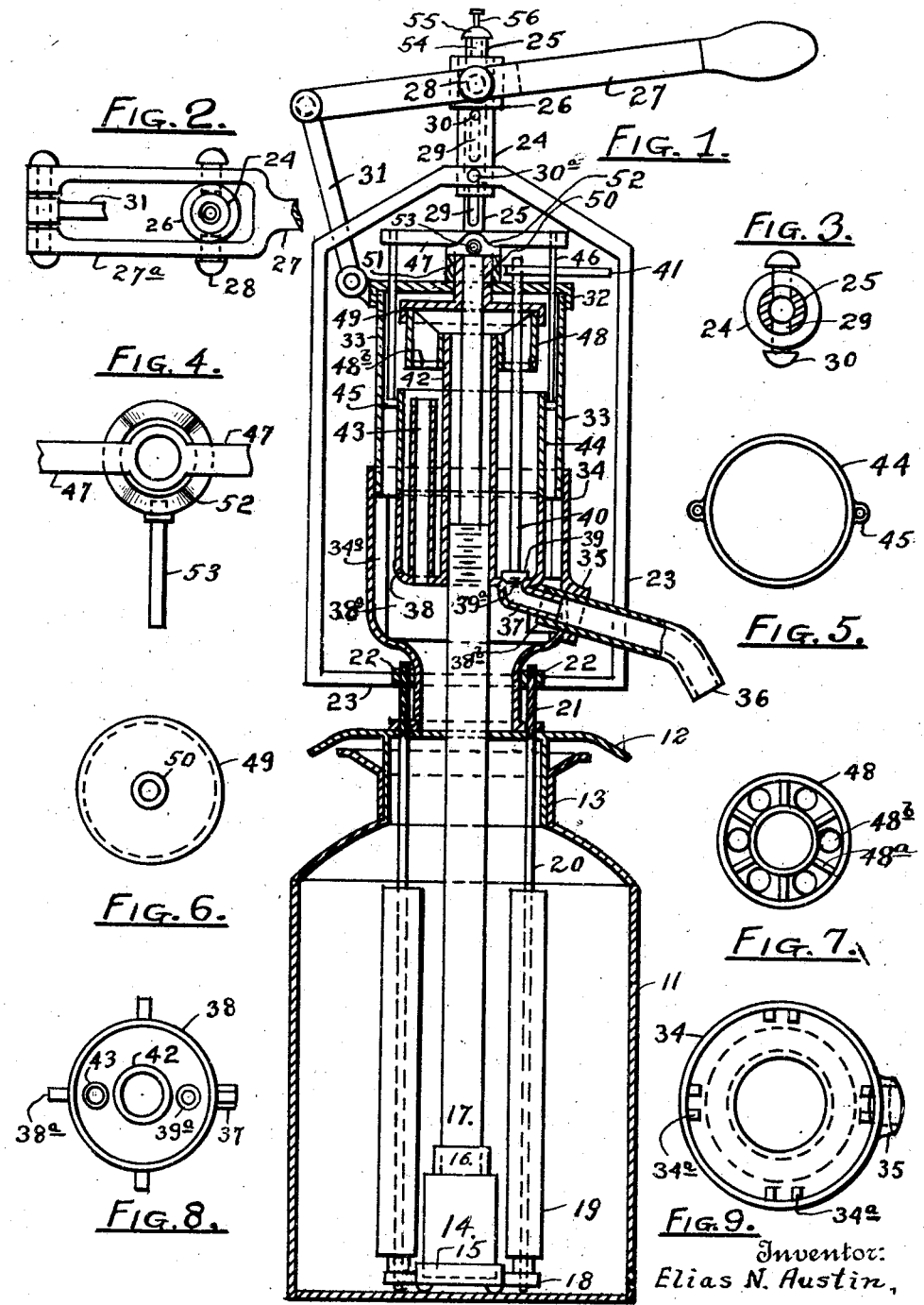

1,682,363

UNITED STATES PATENT OFFICE.

ELIAS N. AUSTIN, OF NEW YORK, N. Y., ASSIGNOR TO S. P. U. CORPORATION, OF NEW YORK, N. Y.

MILK DISPENSING AND MEASURING DEVICE.

Application filed October 7, 1925. Serial No. 61,018.

My invention relates to improvements in milk dispensing devices and it is an improvement of the device described in my patent for milk dispensing and measuring device, issued March 16, 1926, No. 1,576,497.

One of the objects of my improvement is to enable the operator to mix the milk before dispensing it, and also to make the preliminary mixing of the milk to a certain extent unavoidable.

Another object of my improvement is to make the measuring unit of my device detachable from the housing enclosing the same, to facilitate the cleaning of both.

A further object of my improvement is to prevent the glass shield of the housing from being soiled by the milk, which is being pumped into the measuring units, and by the milk, which is overflowing from said units.

A still further object of my improvement is to provide an improved means for raising and lowering the detachable upper measuring unit, or sleeve, which is hereinafter described.

A still other object of my improvement is to provide a means for facilitating the assembling of the parts of my milk dispensing and measuring device.

Other objects and advantages will hereinafter appear.

I attain these objects by the milk dispensing and measuring device, one form of which is illustrated in the accompanying drawings, or by any mechanical equivalent or obvious modification of the same.

In the drawings Fig. 1 is a vertical central section of my milk dispensing and measuring device, showing sundry parts in elevation.

Figures 2 to 9 inclusive are plan views of details of sundry parts of my device, which are hereinafter described.

Similar numerals refer to similar parts throughout the several views; 11 designates a milk can of usual construction having a constricted neck 13, and provided with a cover 12, which has an opening at the central part thereof, and is perforated in a few other places, for the purposes, which are hereinafter described.

A pump cylinder 14 is placed at the bottom of said can 11; the lower head 15 of said cylinder is shown in Fig. 1 as spaced from said bottom by knobs on the underside of said head 15, to admit milk to the lower end of the cylinder.

The arrangement of the piston, piston-rod and valves with releasing rods for the latter, may be substantially the same as in my copending application above referred to.

The upper end of the pump cylinder 14 is provided with a hub 16, to which is connected the lower end of a discharge pipe 17; the lower head 15 of said cylinder has thereon lugs 18, which serve as pivots or bearings for the lower ends of revolving rods 20, which may have each connected thereto, or made in one therewith, a stirring blade 19, which blades are preferably twisted into a helical shape, thereby imparting a vertical motion to the milk.

The upper ends of said rods 20 pass through apertures in the cover 12, and terminate in helically threaded portions 21, which are engaged by nuts 22, carried by a frame 23, the upper end of which is secured by means of a pin 30ª to a sleeve 24, which has secured thereto at the upper end thereof a cap 26.

A lever 27 is shown in Figs. 1 and 2 as connected at the intermediate part thereof to said cap 26 by means of a pair of trunnions 28; the rear end of said lever is pivotally connected to a rocking post 31, as shown.

The sleeve 24 slides on the upper end of a tube 25, which serves as a piston rod.

Pins 30 are shown in Figs. 1 and 3 as secured to said sleeve 24 radially thereof, to slide in slots 29 in said tube 25, the ends of said slots, serving as stops for said pins; this arrangement allows a certain amount of lost motion at the beginning of each stroke of said lever 27 with relation to the piston rod 25, while no lost motion is allowed for the frame 23, which carries the nuts 22, which actuate the stirring rods 20 by means of the threaded ends thereof 21.

In this way the milk contained in the can 11 must be stirred to a certain extent before the pumping operation begins.

By means of a succession of short strokes of the lever 27 stirring of the milk may be had without pumping of the latter.

The ends 21 of the stirring rods 20 are shown as threaded in opposite directions, thereby causing the blades 19 to revolve in opposite directions, thereby causing the milk to be more effectively mixed.

The cover 12 of the can 11 has mounted thereon a housing 34, which may be secured thereto by means of a circular flange, as shown; perforations are provided in said flange for said rods 20—21 to pass therethrough.

The lower end of said housing 34 is open and registers with the central opening in said cover 12.

Additional openings or vents may be provided in the cover 12 for the ingress of air to replace the milk as it is being pumped out.

The housing 34 has thereon a hub 35, through which passes a faucet, or nozzle 36, the inner end of which encloses the end of a spout 37, which leads from an opening 39ª at the bottom of a lower measuring unit 38; the opening 39ª is closed by a valve 39, which has secured thereto the lower end of a vertical valve rod 40, which has connected thereto at the upper end thereof, a handle 41, for manually opening and closing said valve 39.

The lower measuring unit 38 is coaxially enclosed by said housing 34; but it is made separate therefrom and is detachably connected thereto by means of said faucet or nozzle 36, which may be threaded in said hub 35.

Ribs 38ª are provided on said unit 38, as shown in Figs. 1 and 8, to keep the latter coaxially spaced from said housing 34; and corresponding double guides 34ª are provided in said housing 34, as shown in Figs. 1 and 9, to register with said ribs 38ª, which are placed therebetween, thereby facilitating the assembling of said unit 38 with said housing 34.

A clearance or cut-out 38ᵇ is formed in one of the ribs 38ª, to make room for the inner end of said faucet 36, as shown in Fig. 1.

The lower measuring unit 38 has made in one therewith or may have connected thereto the central tube 42 and the overflow duct 43, as shown in Figs. 1 and 8; the lower end of said tube 42 has secured thereto interiorly thereof the upper end of the discharge pipe 17.

The upper end of said tube 42 extends through an upper measuring unit or sleeve 44 and has secured thereto, at the upper end thereof, a discharge drum 48, which is shown in Figs. 1 and 7 as consisting mainly of two concentric cylindrical shells joined by radial ribs 48ª; openings 48ᵇ of any desired form may be provided at the lower end of said drum 48, from which milk may be made to flow vertically downward into the measuring units 38 and 44 without impinging upon the cylindrical glass shield 33, which is mounted at the upper end of said housing 34, and has its upper end closed by a lid 32.

The milk, when measured by said units 38 and 44, is contained in the annular space enclosed between the outer shells of said units and the said tube 42, whereby leakage of milk from said units is prevented; also no packing is required between said units and the discharge pipe 17.

The drum 48 is closed at the upper end thereof by a detachable top 49, shown in Figs. 1 and 6, which top has thereon a hub 50 for said piston rod 25 to pass therethrough; said hub 50 extends through an opening in said lid 32, and has a nut 51 secured thereto at the upper end thereof, said nut bearing on said lid 32 to keep the same in position on the upper end of said shield 33.

The said overflow duct 43 extends from said unit 38 through the greater part of the upper measuring unit 44, the upper rim of the latter being somewhat higher than the opening at the upper end of said duct, whereby milk is prevented from overflowing at the outer edges or periphery of said unit 44 and is kept from soiling the glass shield 33.

The lower unit 38 may conveniently measure a pint, and the two units 38 and 44 when joined together, as shown in Fig. 1, may measure a quart up to the point of overflow into said duct 43, as above described.

The unit or sleeve 44 may be raised from said unit 38, as described in my patent, above referred to, and in a more perfect manner, by providing said units 38 and 44 with an abutment joint and said unit or sleeve 44 at the periphery thereof, exteriorly thereto, with lugs or ears 45 as shown in Fig. 5; reach rods 46 are secured at their lower ends to said lugs 45, their upper ends pass through openings in said lid 32 and are joined by a yoke 47 shown in Figs. 1 and 4, which yoke rests on a circular face-cam 52, shown in Figs. 1 and 4 which cam is provided with a handle 53, by means of which said cam may be turned, thereby either raising or lowering the said yoke 47 and thereby either raising the unit 44 from the unit 38 or setting said unit 44 down into position on the unit 38.

The tubular piston rod 25 encloses a hollow stem 54, which is connected at its lower end to a piston valve, as described in my above mentioned copending application, and the upper end of said stem 54 terminates in a knob 55 above said rod 25, whereby the stem 54 may be lifted, thereby raising the piston valve.

An inner rod 56 is enclosed by said stem 54, the lower end of said rod 56 being connected to the foot valve of the pump cylinder, as described in said copending application, and the upper end of said rod 56 extends above said stem 54, as shown in Fig. 1, whereby said rod 56 may be lifted and whereby the foot valve of the pump cylinder may be raised simultaneously with the raising of the piston valve, thereby releasing the milk contained in the discharge pipe 17 and tube 42.

The operation of the above described milk dispensing and measuring device is similar to that of the device of my copending application, except that it is more perfect as was hereinbefore pointed out in the description of the sundry parts of my improved device.

Many changes may be made in the design of the details of my milk dispensing and measuring device without departing from the main scope of my invention, and parts of my invention may be used without other parts.

I do not, therefore, restrict myself to the details as shown; but I intend to include also all mechanical equivalents and reasonably obvious modifications of the same within the scope of my invention.

I claim as my invention and desire to secure by Letters Patent:

1. In a milk dispensing device a milk pump, to be enclosed by a milk can, a means for actuating said pump, a pair of stirring blades, rotatably mounted on opposite sides of said pump, to revolve each on a vertical axis passing through the blade, and means for turning said blades on their axes, said turning means being operatively connected to said actuating means.

2. In a milk dispensing device a milk pump, to be enclosed by a milk can, a means for actuating said pump, a pair of stirring blades, rotatably mounted on opposite sides of said pump, to revolve each on a vertical axis, passing through the blade, a helically threaded member on each of said blades, a nut, in engagement with each of said members, and a means for imparting a vertical motion to said nuts, thereby turning said blades, said imparting means being operatively connected to said actuating means.

3. In a milk dispensing device a pump, having a piston rod connected thereto, a milk stirring mechanism, a means for actuating the same and said piston rod, a sleeve carried by said means, said sleeve to slide on said piston rod, a pin on said sleeve and a slot in said piston rod, in engagement with said pin, said pin to transmit motion from said means to said rod, and said slot to cause a lost motion to said rod at each end of the stroke of said sleeve, thereby causing said mechanism to be actuated before said rod and independently thereof at the beginning of each stroke of said sleeve.

4. In a milk dispensing device a pump to be enclosed by a milk can, a means for actuating the pump, a pair of stirring blades, rotatably mounted inside of said milk can, to revolve each on a vertical axis passing through the blade, and a means for turning said blades in opposite directions to each other, said turning means being operatively connected to said actuating means.

ELIAS N. AUSTIN.